Patented Dec. 11, 1923.

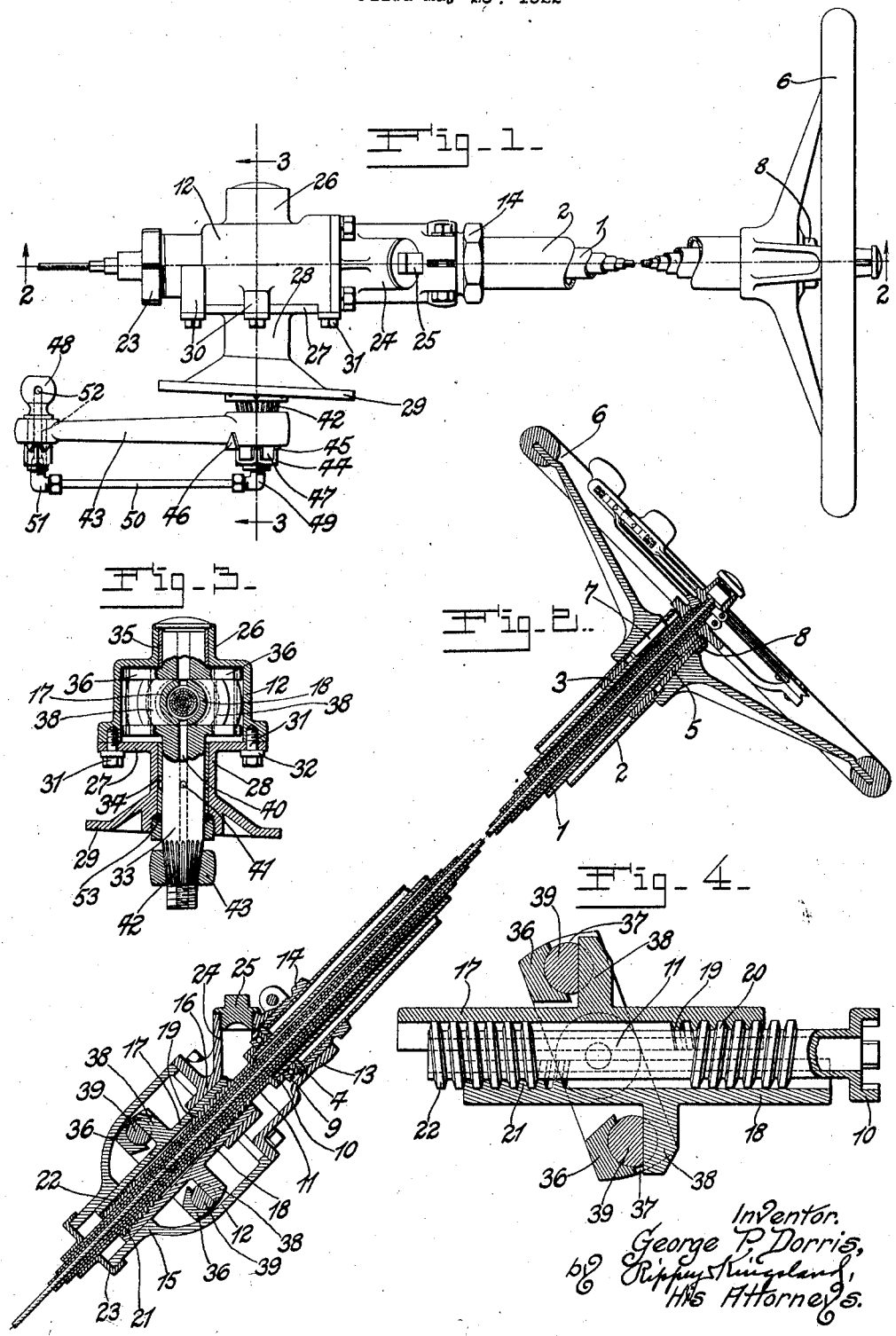

1,476,956

UNITED STATES PATENT OFFICE.

GEORGE P. DORRIS, OF ST. LOUIS, MISSOURI.

STEERING DEVICE.

Application filed May 29, 1922. Serial No. 564,331.

*To all whom it may concern:*

Be it known that I, GEORGE P. DORRIS, a citizen of the United States, residing at St. Louis, Missouri, have invented a new and useful Steering Device, of which the following is a specification.

This invention relates to steering devices for use on motor vehicles.

An object of the invention is to provide an improved steering device in which the parts are permanently retained in proper relationship for most efficient service and in which relative displacement of the parts is normally prevented.

Another object of the invention is to provide a steering device embodying the structure mentioned and also including means for properly adjusting the device and for holding the parts thereof from displacement.

Another object of the invention is to provide a steering device including a rocker crank for operating the drag link and novel means for retaining the controlling devices therefor in proper adjustment and for lubricating the operative parts.

Other objects of the invention are to provide an improved steering device including a pair of half nuts for operating the rocker crank and novel means for holding them in proper relationship to the other parts; a circular cover plate for the supporting casing capable of accurate adjustment in any required position on the casing, and formed integrally with a flange for mounting; means for preventing leakage of oil from the casing containing the rocker crank; an oil passage for conveying oil to the ball pin that is connected with the drag link; and an improved chuck device for mounting the steering wheel in connection with the steering column.

In the drawings—

Fig. 1 is a plan view of my improved steering device.

Fig. 2 is a longitudinal sectional view on the line 2—2 of Fig. 1.

Fig. 3 is a sectional view on the line 3—3 of Fig. 1.

Fig. 4 is a sectional view showing the split nut and the relationship of the parts thereof to the steering column and the rocker crank.

In the embodiment of the invention shown the tubular steering column 1 is rotatively supported within an enclosing tube 2 within which it is concentrically supported by a sleeve 3 at the upper end and a thrust member 4 at the lower end. A tapered sleeve 5 is rigid with the steering column 1 above the end of the tube 2. The hub of the steering wheel 6 has a tapered opening therethrough which receives the tapered sleeve 5. A groove is formed in the sleeve 5 and a similar groove is formed in the hub of the steering wheel 6 for the reception of a key 7 to prevent the wheel from turning with respect to the steering column. The upper end of the sleeve 5 is threaded for the reception of a nut 8 by which the steering wheel is forced down onto the tapered sleeve. By this construction and arrangement the steering wheel is held in rigid connection with the steering column and is prevented from working loose. The parts are formed so that a perfect fit is obtained and so that when the nut 8 is screwed down on the sleeve 5 the steering wheel is forced down onto the larger portion of said sleeve.

A thrust bearing 9 is mounted on the steering column 1 below the thrust member 4. The lower ring of the thrust bearing 9 presses against the end of a dental clutch member 10 formed on the upper end of a separate part 11 of the steering column. The dental clutch member 10 is engaged by projections on the lower end of the steering column 1 so that the extension 11 of the steering column is controlled thereby.

The supporting casing comprises a lower portion 12 and a separate upper portion 13. The two portions 12 and 13 of the supporting casing are rigidly secured together. The lower end of the steering column extends into the supporting casing as shown (Fig. 2). A sleeve 14 is loose upon the enclosing tube 2. The lower end of the sleeve 14 is exteriorly threaded and the upper portion thereof is polygonal in the form of a nut and is adapted to be engaged by a wrench in order to screw the sleeve into the interiorly threaded upper end of the portion 13 of the supporting casing. The lower end of the sleeve 14 contacts with the thrust member 4 and forces the steering column down to proper position in the casing and holds said parts in proper relationship after they have been assembled.

A bearing 15 is formed in the lower end of the part 12 of the supporting casing and a cooperating bearing 16 is formed in the upper portion 13 of said casing.

A split nut or sleeve comprising a member 17 and a separate member 18 is mounted for sliding movements in the bearings 15 and 16. The inside of the upper end of the member 17 is provided with left hand screw threads 19 engaging counterpart threads 20 on the steering column member 11; while the lower end of the member 18 is provided with right hand screw threads 21 engaging counterpart screw threads 22 on the lower end of the steering column member 11. This construction and arrangement leaves the two members 17 and 18 of the split nut or sleeve free for movement in opoposite directions when the steering column is turned. The lower end of the casing is closed by a cap 23. The upper portion of the casing is provided with an oil inlet 24 through which the casing may be supplied with oil or other lubricating material, said inlet having a removable closure 25.

The lower part 12 of the casing is open at one side, and the opposite side is provided with a bearing 26. The open side of the casing 12 is closed by a removable cover plate 27 having a tubular extension 28 formed in alinement with the bearing 26. The end of the tubular extension 28 has an integral flange 29 whereby the supporting casing is mounted. The cover plate 27 fits between an annular series of bosses 30 formed on the casing 12. Screws 31 in the bosses 30 have washers 32 engaging the edge of the cover plate 27 so as to hold the supporting casing in connection with the cover plate. Since the cover plate is circular the supporting casing may be secured thereto at any desired angle of inclination and will be rigidly held when the screws 31 are tight.

A shaft 33 is journaled for rotation in a bushing 34 in the sleeve 28 and has its opposite end journaled for rotation in a bushing 35 in the bearing 26. The shaft 33 comprises two axially alined portions, one of which is journaled in the bushing 34 and the other of which is journaled in the bushing 35, said two portions being separated from each other axially by a space through which the members 17 and 18 extend. The two portions of the shaft 33 are connected by a pair of cranks 36 milled or otherwise formed to provide spaces 37 to receive the radial arms 38 on the members 17 and 18, respectively. This formation prevents the members 17 and 18 from turning but permits axial movement thereof as required to rock the rocker crank comprising the shaft 33 and the cranks 36. A rotative thrust member 39 is supported by each of the cranks 36. Each of said thrust members 39 is provided with a flat surface for engaement with the corresponding radial arm 38 of the cooperating member 17 or 18 of the split nut or sleeve. Thus, by turning the steering column to the left the member 17 will be operated downwardly to rock the rocker crank, while the member 18 is moved upwardly to permit such movement, and vice versa.

Since the edges of the members 17 and 18 are spaced from each other the oil within the casing may pass between said members and thence into a passage 40 in the rocker crank 33. An opening 41 from the passage 40 supplies lubricant to the bearing 34.

The outer end of the rocker crank shaft 33 is tapered (Fig. 3). The tapered portion of the rocker crank shaft is provided with teeth 42 adapted to be engaged by teeth in the steering lever 43. This arrangement permits the lever 43 to be rigidly secured in any desired relative adjustment of the rocker crank shaft. The outer end of the rocker crank shaft is threaded and receives a nut 44 by which the lever 43 is forced onto the end of the rocker crank 33 and retained thereon. The nut 44 is held from working loose by a washer 45 having projections 46 adapted to embrace the lever 43 to hold the washer from turning, and by projections 47 adapted to be bent up to engage the nut 44 after the parts have been assembled.

The passage 40 exends to the outer end of the rocker crank shaft 33. The oil line leads from the outer end of the shaft 33 to the connecting ball 48 by which the lever 43 is connected to the drag link. As shown, said oil line comprises a fitting 49 secured to the end of the rocker crank shaft 33 and a tube 50 leading from the fitting 49 to a fitting 51 connected with the end of the lever 43 and adaped to deliver oil into a passage 52 opening through the ball 48.

A packing device 53 is provided at the end of the bearing 34 to prevent leakage of oil while leaving the rocker crank device 33 free to rock therein.

From the foregoing it will be seen that my invention accomplishes all of its intended objects and purposes in a very effiicent manner. After the parts of the device have been assembled they are retained in proper relationship and are perfectly noiseless in operation. The steering column and the parts 17 and 18 are held in proper adjustment with respect to the rocker crank device by means of the sleeve 14. Wearing of the parts is substantially prevented by the perfect lubrication system described. The provision of the rotary members 39 which are constantly lubricated, practically overcomes the frictional resistance and makes operation of the members 17 and 18 free and easy.

I am aware that the construction, arrangement and relationship of parts may be varied in order to adapt the device for use in different embodiments without departure from the nature and principle of the invention. I do not restrict myself unessentially, but what I claim and desire to secure by Letters Patent is:—

1. A steering device, comprising a casing, a rocker shaft supported by the casing, a pair of cranks on said shaft within the casing in spaced relationship, a steering column supported by the casing and extending through the space between said cranks, right and left hand threads on the steering column within the casing, a pair of non-contacting sliding members engaging said threads respectively and extending through the space between said cranks to opposite sides of said crank shaft, bearings at opposite sides of said crank shaft supporting said sliding members, a rotary thrust member supported by each of said cranks, a flat surface on each of said thrust members, an arm on each of said sliding members engaging the flat surface of one of said members, and means whereby said cranks prevent said sliding members from turning and from contacting with each other.

2. A steering device, comprising a casing, a rocker shaft supported by the casing, a pair of cranks on said shaft within the casing in spaced relationship, a steering column supported by the casing and extending through the space between said cranks, right and left hand threads on the steering column within the casing, a pair of non-contacting sliding members engaging said threads respectively and extending through the space between said cranks to opposite sides of said crank shaft, bearings at opposite sides of said crank shaft supporting said sliding members, a rotary thrust member supported by each of said cranks, a flat surface on each of said thrust members, an arm on each of said sliding members engaging the flat surfaces of one of said members, means whereby said cranks prevent said sliding members from turning and from contacting with each other, a series of teeth on the outer portion of said rocker crank shaft, a lever having a hole in one end thereof to receive the rocker crank shaft, and teeth formed on said lever for engaging the teeth on the rocker crank shaft to hold said lever in accurate adjustment on said crank shaft.

3. In a steering device, a casing, a rocker crank shaft journaled for rocking movements in said casing, cranks on said shaft having notches therein, bearings in said casing above and below said crank shaft, sliding sleeve members extending through said cranks and having both ends thereof journaled in said bearings for longitudinal movements and having their edges spaced from each other, a steering column for operating said sleeve members, an arm on each of said sleeve members extending into the notch in the corresponding crank and thereby holding the sleeve members from turning and with their edges spaced apart, and a lever attached to the outer end of said rocker crank shaft.

4. In a steering device, a casing, a rocker crank shaft journaled for rocking movements in said casing, cranks on said shaft having notches therein, bearings in said casing above and below said crank shaft, sliding sleeve members extending through said cranks and having both ends thereof journaled in said bearings for longitudinal movements and having their edges spaced from each other, a steering column for operating said sleeve members, an arm on each of said sleeve members extending into the notch in the corresponding crank and thereby holding the sleeve members from turning and with their edges spaced apart, a lever attached to the outer end of said rocker crank shaft, and means for holding said lever positively in any desired adjustment relative to the shaft.

5. In a steering device, a casing, a rocker crank shaft journaled for rocking movements in the casing, cranks in connection with said shaft having notches therein, a rotary thrust member supported by each of said cranks and each provided with a flat side, a pair of sliding members supported in the casing, a steering column for operating said sliding members in opposite directions, an arm on each of said sliding members engaging the flat face of the corresponding thrust member, a lever attached to the outer end of said shaft, a passage for admitting lubricant into the casing, said sliding members being spaced apart to admit lubricant between them and the steering column, a connecting ball on said lever, and means for conducting lubricant from said casing to said ball.

6. In a steering device, a casing, a rocker crank shaft journaled for rocking movements in said casing, cranks on said shaft having notches therein, a rotary abutment member supported by each crank extending across the notch in the crank and having a flat surface, sliding sleeve members mounted for longitudinal movement in said casing, a steering column for imparting sliding movements to said sliding members, an arm on each of said sleeve members extending into the notch in the corresponding crank and engaging the flat surface of the rotary abutment member and thereby holding the sleeve member from rotating, a device for connection with said shaft for operating a drag link, and means for conducting lubricant from said casing to said device.

7. In a steering device, a casing, bearings in said casing, a crank shaft journaled for rocking movements in said casing, mechanism for rocking said shaft, a passage through the shaft for conducting lubricant to said bearings from the casing, a device in connection with said shaft for operating a drag link, and a passage for conducting lubricant from the passage through said shaft to said device.

8. In a steering device, a casing, a rocker crank shaft journaled for rocking movements in said casing, cranks in connection with said shaft having milled notches therein, a rotary abutment member supported by each crank and extending across the notch in the crank and having a flat surface, a pair of sliding members supported within the casing, arms on each sliding member extending into the notch in the corresponding crank and bearing against the flat surface of the corresponding abutment member, a steering column for operating said sliding members in opposite directions, a lever attached to said shaft for connection with a drag link, and a passage for conducting lubricant from said casing to the point of connection of said lever with the drag link.

GEORGE P. DORRIS.